(12) United States Patent
McKenzie et al.

(10) Patent No.: US 9,342,920 B1
(45) Date of Patent: May 17, 2016

(54) VOLUME RENDERING USING SCALABLE GPU-BASED CLOUD COMPUTING

(71) Applicant: Intrinsic Medical Imaging LLC, Bloomfield Hills, MI (US)

(72) Inventors: Lee R. McKenzie, Howell, MI (US); Mark C. McKenzie, Howell, MI (US)

(73) Assignee: Intrinsic Medical Imaging, LLC, Bloomfield Hills, MI (US)

( * ) Notice: Subject to any disclaimer, the term of this patent is extended or adjusted under 35 U.S.C. 154(b) by 240 days.

(21) Appl. No.: 13/678,207

(22) Filed: Nov. 15, 2012

Related U.S. Application Data

(60) Provisional application No. 61/559,932, filed on Nov. 15, 2011.

(51) Int. Cl.
*G06T 15/08* (2011.01)

(52) U.S. Cl.
CPC ..................................... *G06T 15/08* (2013.01)

(58) Field of Classification Search
CPC ......... G06F 9/44; G06F 3/048; G06F 9/5072; G06F 8/34; G06F 17/30575; G06F 17/30864; G06F 17/30194; G06T 1/20; H04L 67/10
See application file for complete search history.

(56) References Cited

U.S. PATENT DOCUMENTS

| 6,028,608 A * | 2/2000 | Jenkins ................. G06T 1/0021 345/619 |
| 2008/0024493 A1* | 1/2008 | Bordoloi et al. ............... 345/423 |
| 2008/0031402 A1* | 2/2008 | Xue ......................... G06T 15/08 378/4 |
| 2009/0164908 A1* | 6/2009 | Diamond ....................... 715/733 |
| 2010/0134494 A1* | 6/2010 | Lim et al. ....................... 345/426 |
| 2011/0122997 A1* | 5/2011 | Lu ......................... A61N 5/1031 378/65 |
| 2012/0050259 A1* | 3/2012 | Solomonov et al. .......... 345/419 |
| 2013/0091500 A1* | 4/2013 | Earl et al. .......................... 718/1 |

OTHER PUBLICATIONS

Haddop Fair Scheduler, Apr. 2010, url: https://hadoop.apache.org/docs/stable1/fair_scheduler.html.*
Wiki—Volume_redering, Aug. 2011, url: https://en.wikipedia.org/wiki/Volume_rendering.*
Wiki—Shader, Jul. 2011, url: https://en.wikipedia.org/wiki/Shader#Pixel_shaders.*
Zhang, Adaptive Sampling and Rendering of Fluids on the GPU, IEEE VGTC Workshop on Volume Graphics 2008.*

* cited by examiner

*Primary Examiner* — Ming Hon
*Assistant Examiner* — Phuc Doan
(74) *Attorney, Agent, or Firm* — David H. Judson

(57) ABSTRACT

A GPU-based cloud computing platform is used to facilitate data computations on behalf of requesting users. In this embodiment, a user of a thin client has an associated dataset that requires computation. That dataset is adapted to be delivered to a computing platform, such as the GPU-based cloud, for computation, such as to facilitate a 3D volume rendering. The result of the computation is then returned to the user. Multiple such users may be operating clients and requesting computations from the cloud in a similar manner, possibly concurrently.

7 Claims, 10 Drawing Sheets

VOLUME RENDERING USING SCALABLE GPU-BASED CLOUD COMPUTING

This application is based on and claims priority to Ser. No. 61/559,932, filed Nov. 15, 2011.

BACKGROUND OF THE INVENTION

1. Technical Field

This disclosure relates generally to medical imaging.

2. Background of the Related Art

Medical imaging is the technique used to create images of the human body or parts thereof for clinical purposes (medical procedures that seek to reveal, to diagnose or to examine disease) or medical science (including the study of normal anatomy and physiology). Computer tomography (CT) and magnetic resonance imaging (MRI) are two of the most common approaches. These techniques generate a set of individual 2D images that can be displayed in a 3D visualization as a "volume dataset." Typically, however, the extent of the 3D visualization is limited to "orbiting" and "zooming." In an "orbit" mode, the view of the object being rendered is like an orbiting satellite in that the viewer can move around the object being viewed from any angle but cannot look "out" from a position within the object. A zoom operation provides the viewer with additional useful details about the object; however, zooming does not enable the viewer to move down to a surface or inside of a volume. Thus, the orbit and zoom approach has limited applicability for rendering and viewing a volume medical dataset.

Due to the large amount of data involved, techniques for volume rendering may use graphics processors, including a graphics processing unit (GPU) and associated software routines.

Cloud computing is a model of service delivery for enabling on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications). For further details regarding the cloud computing model in which this disclosure may be implemented, see "Draft NIST Working Definition of Cloud Computing" by Peter Mell and Tim Grance, dated Oct. 7, 2009.

In GPU-based cloud computing, the cloud contains many GPUs, which are handed out to requesting users on a one-to-one basis.

The advent of fast networks and the trend towards smaller thin client devices with low power requirements lies in stark contrast to the ever growing need for faster processing and in particular graphics processing on such GPUs.

BRIEF SUMMARY

A GPU-based cloud computing platform is used to facilitate data computations on behalf of requesting users. In this embodiment, a user of a thin client has an associated dataset that requires computation. That dataset is adapted to be delivered to a computing platform, such as the GPU-based cloud, for computation, such as to facilitate a 3D volume rendering. The result of the computation must be returned to the user. Multiple such users may be operating clients and requesting computations from the cloud in a similar manner, possibly concurrently.

In one embodiment, involving a single GPU in the cloud, datasets from a set of requesting users are retained and stored in memory of the GPU simultaneously. Once all the users' datasets are loaded into the memory, an instance of a pixel shader (with a dedicated number of pixels) is assigned to each user. The assigned number of pixels for each user dynamically changes in relation to the number of users sharing that particular GPU. As described herein, a pixel represents a work unit, and the more pixels that are assigned to a particular user. By dynamically changing the number of pixels any particular user is sharing, the single GPU is able to support a dynamic number of users.

In another embodiment, a single user is allowed to utilize resources from more than one GPU simultaneously. If the user has requested and is authorized to do so, additional pixels, or work units, are assigned to a particular user from more than one GPU. In this approach, typically the entire user dataset is duplicated across all shared GPUs. Using this method, a single user would be able to harness the vast resources of an entire GPU cloud, e.g., when the cloud is under light load conditions.

In either use case scenario, the results of this GPU-based computation are then transferred back to the requesting user. This can be achieved using normal binary file transfer over fast networks, or optionally, the resultant data (which may be a video stream or some other type of data) may be encoded or compressed (prior to streaming) to achieve faster network transfer. The resultant data may be transferred either in a real-time manner or on an as-needed (or on-demand) basis.

In this manner, the described method may be used either for relatively long-term and time-consuming calculations, or very short-term (real-time) calculations, and thus could be used for real-time applications such as 3D volume rendering.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
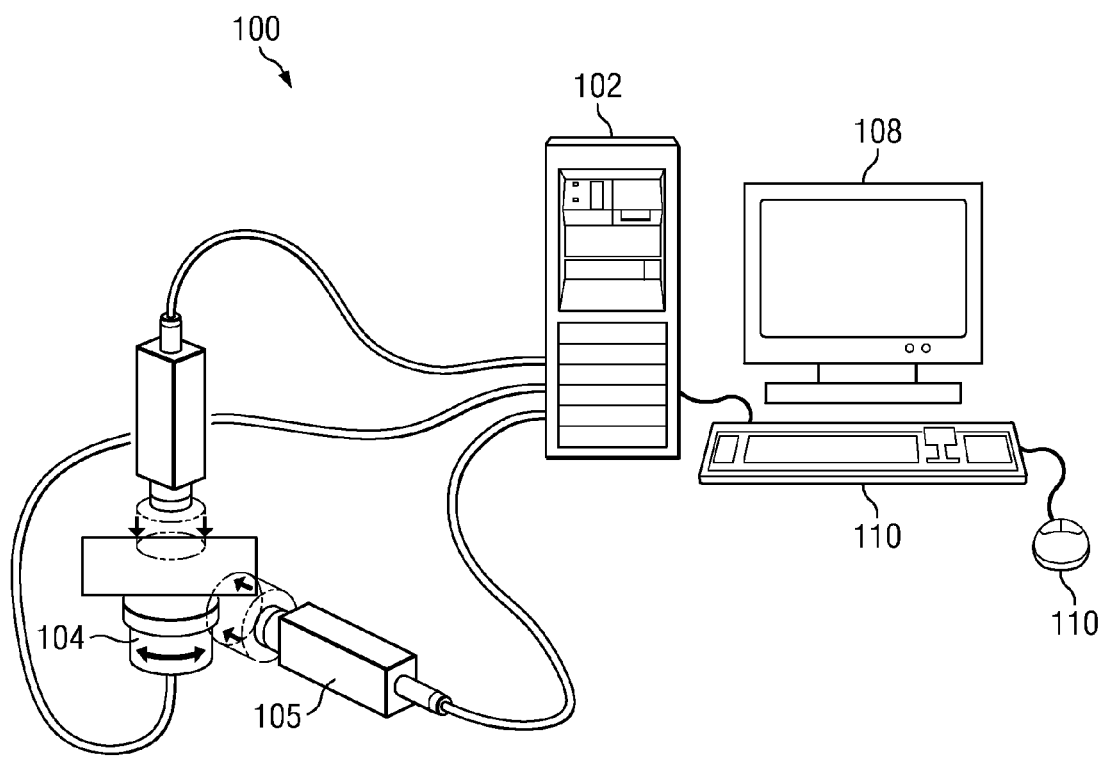
FIG. 1 illustrates a computer system coupled to a medical imaging system.

As illustrated in FIG. 1, a system 100 in which the subject matter herein is implemented comprises a computer system 102 having a display monitor 108, and one or more input devices 110 such as a keyboard, a pointing device, or the like. The computer system 102 is illustrated as a desktop workstation, but this is not a limitation, as the system may be implemented in a laptop or notebook computer, a wireless computing device (such as an iPad), or any other computing machine that includes a display. The techniques of this disclosure are not limited to any particular type of computing device, system or architecture, and one or more of the elements of the machine may be located in different locations. Thus, for example, the display monitor may be positioned remotely from other components. For convenience of illustration only, the computer system 102 is shown as receiving inputs from a pair of imaging devices 105 that are associated with a support 104. The support 104 rotates or reciprocates relative to the imaging devices 105 to generate a set of individual 2D images of an object being scanned. Typically, the support 104 has associated mechanical elements, hydraulic elements and/or electronic elements (not shown) that control the position or rotational speed thereof. The support may be under computer control. Likewise, the one or more imaging devices 105 include associated optical elements, mechanical elements, and/or other control elements that control the position and operation of the device. Typically, an object to be imaged (e.g., a human body, or some part thereof) is located on the support 104. The support may be fixed, in which case the imaging devices 105 rotate or reciprocate with respect thereto. One of ordinary skill in the art will appreciate that the support 104 and imaging devices 105 represent conventional medical imaging systems such as computer tomography (CT), magnetic resonance imaging (MRI), or the like. Typically, such systems are external to the imaging system of this disclosure, although the imaging techniques herein may be implemented natively within such known imaging systems. The 2D images comprising a particular scan typically conform to a standard digital data format (e.g., DICOM) and are received by the computer system 102 in any convenient manner, e.g., a CD, DVD, USB stick, hard drive, network drive, PACS (a medical CT library), or the like. Of course, the computer system 102 may be network-accessible, in which case the digital data comprising the volume data may be received over a communication network, such as any Internet Protocol (IP)-based network, a wireline network, a wireless network, or the like.

As noted above, this disclosure provides a display method, preferably implemented in a computer, such as a workstation as shown in FIG. 1. More generally, the method is implemented using one or more computing-related entities (systems, machines, processes, programs, libraries, functions, code, or the like) that facilitate or provide the inventive functionality. In a representative but non-limiting implementation, the display methods described herein are implemented in a machine comprising a CPU (central processing unit), such as any Intel- or AMD-based chip, computer memory, such as RAM (at least 1 GB), a hard drive (at least 8 GB), and a CD-drive (preferably 24-48×). The machine software includes an operating system (e.g., Windows XP, Windows Vista, Windows 7, any Apple OS, either 32 bit or 64 bit), and generic support applications. If the process is implemented in a graphics processor, preferably the machine comprises a graphics processing unit (GPU) such the AMD Radeon Series 4850 or equivalent (preferably at least DirectX 9-compliant and Pixel Shader 3.0-compliant).

Figure 2:
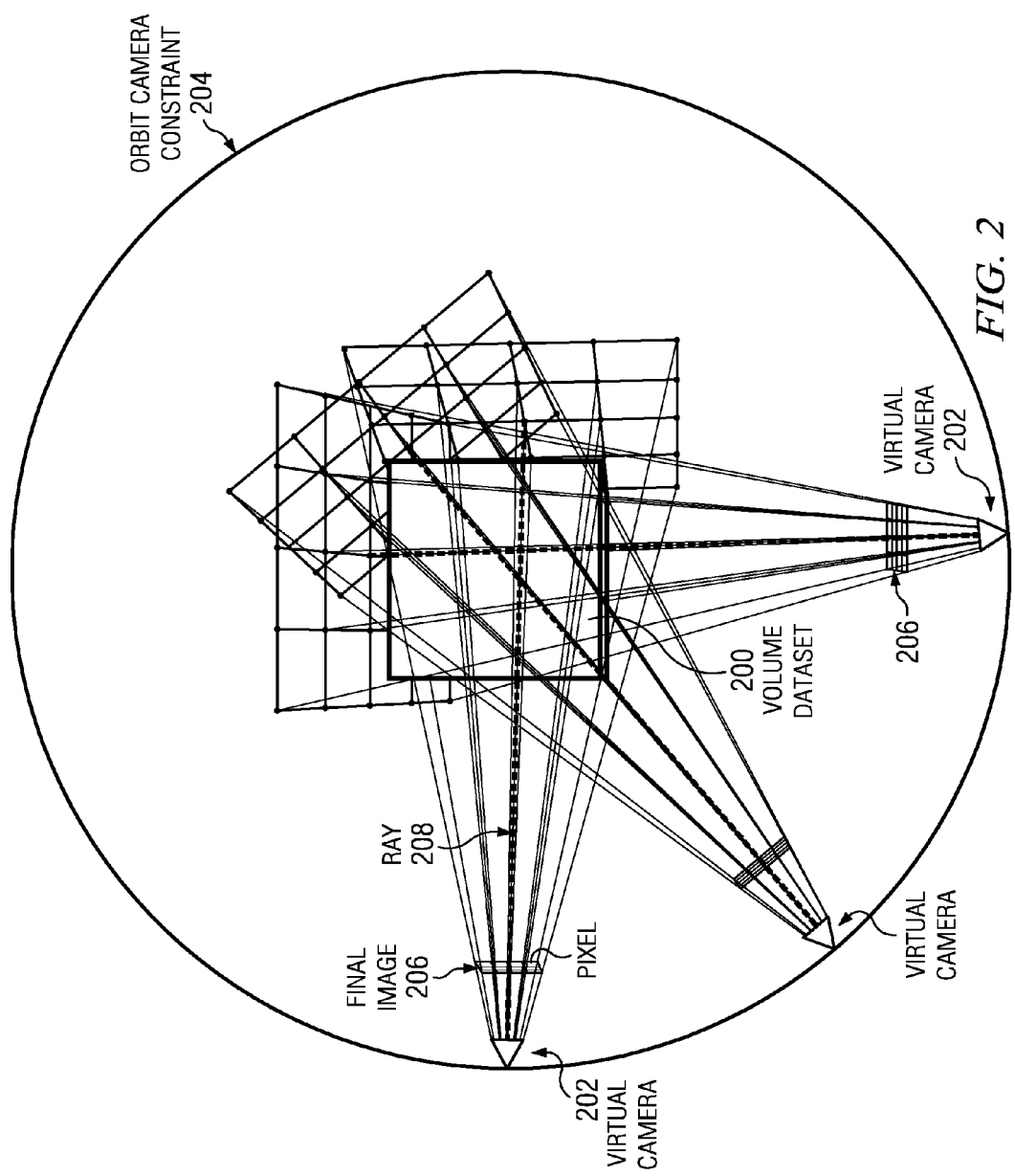
FIG. 2 illustrates a technique for rendering and "orbiting" about a volume dataset.
Figure 3:
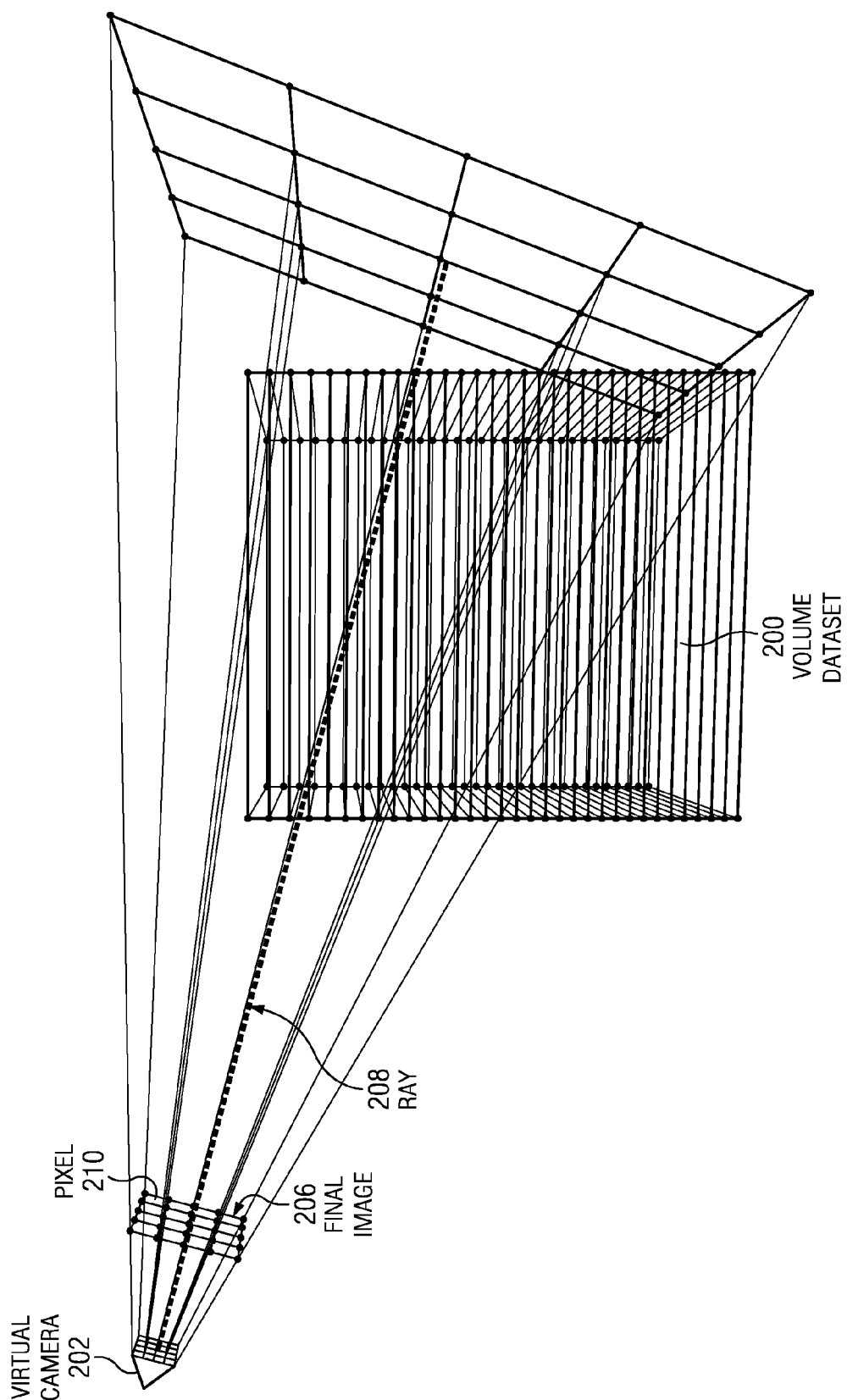
FIG. 3 illustrates how ray tracing is used to generate a final image using a virtual camera.

By way of background, FIG. 2 illustrates a known technique for visualizing a volume dataset 200. The volume dataset is a stack or assembly of 2D images forming a cube (or 3D dataset). In this approach, a virtual camera 202 orbits around the dataset along the constraint 204, which constraint is shown in the drawing as a circle but is actually a sphere in three dimensions. The virtual camera 202 is a machine-implemented software-generated construct that has a position, an orientation, and a resolution. The virtual camera renders a final image 206 at a display rate by ray tracing. In the drawing, a single virtual camera is shown a various positions along the orbital constraint. In each position, the virtual camera produces a final image in the manner illustrated in FIG. 3. Ray tracing is a process by which a set of rays are cast forward into the volume dataset from the virtual camera and intersected with structures therein to produce the final image comprising a set of pixels. In particular, a ray 208, which is a line with a direction located at a point in space, is cast forward into the scene to find an intersection point or final value (brightness or color) for a single pixel 210 in the final image. Each "ray" is generated in software and simulates light generated from the camera. The virtual camera is "operated" (once again, virtually) at a given frame rate (or frames "per second"). Thus, if the frame rate is 24, the virtual camera produces the final image 206 every second with 24 distinct frames. Each frame comprising a number of 2D pixels. The pixels in a particular frame are uniform in that they are of the same size. Any individual pixel in the volume dataset is sometimes referred to as a voxel.

Figure 4:
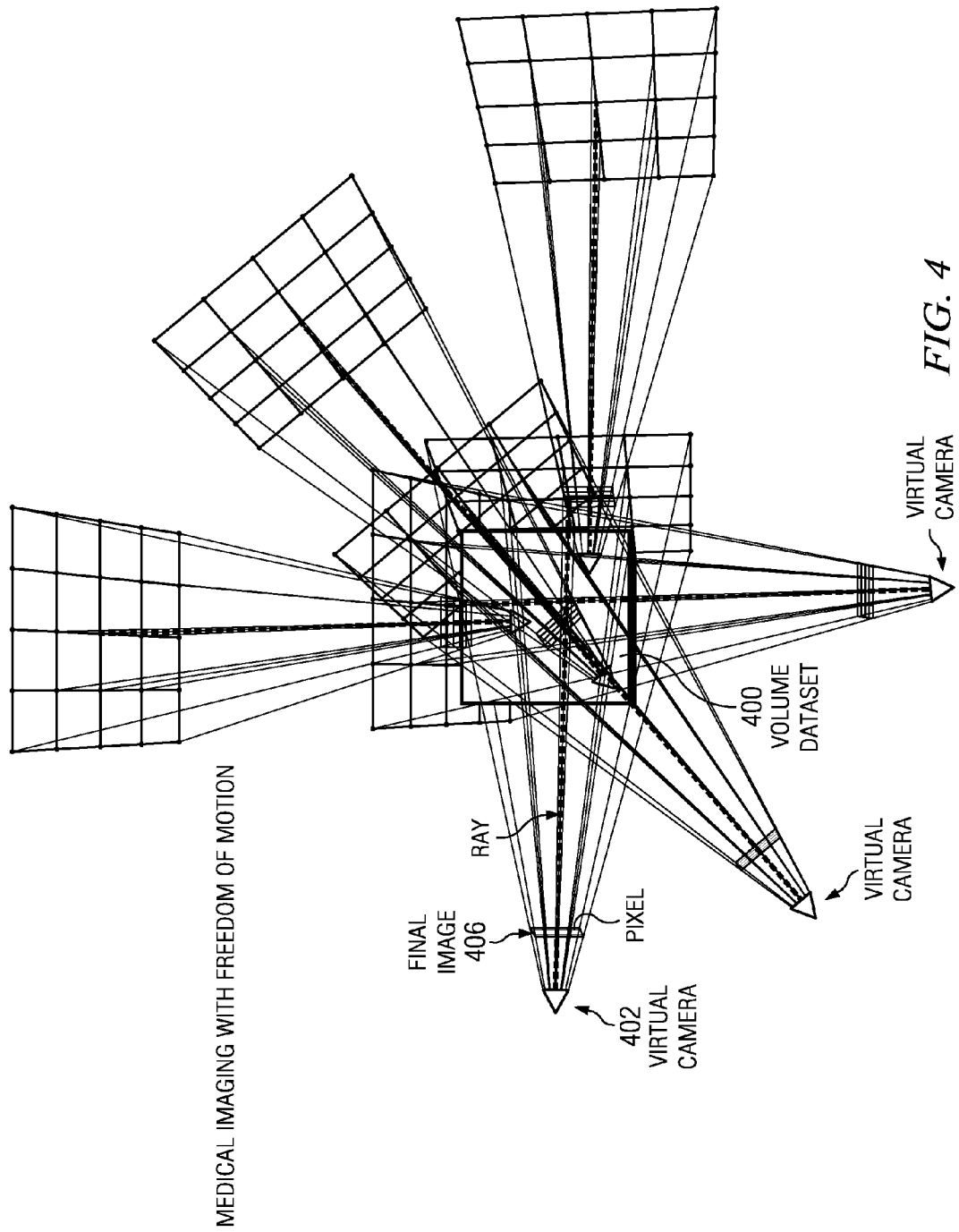
FIG. 4 illustrates the technique of this disclosure for rendering and viewing a volume dataset from any position external to or within the dataset.

As described above, the "orbit" approach illustrated in FIG. 2 is quite limiting. FIG. 4 illustrates the approach of the subject disclosure, wherein the volume dataset 400 is rendered using a virtual camera 402 that displays the final image 406 without any position constraint. In this approach, the virtual camera 402 may be moved to any position outside or even within the volume dataset. Several of these internal positions are illustrated. In this novel approach, the virtual camera is movable (using the input device) inside the volume dataset, and the viewer can navigate along and through internal structures that are represented therein. Thus, according to this approach, and unlike the prior art, the viewer has full freedom-of-motion within and around the volume dataset, or any portion thereof.

There are two (2) techniques that facilitate the disclosed method: (i) continuous real-time dynamic rendering resolution, and (ii) continuous per pixel dynamic sampling distance for ray tracing volume datasets. Each of these techniques is now described.

As used herein, "resolution" refers to a spatial number of pixels horizontally and vertically, with respect to a picture (image) that is drawn from a particular display frame. "Rendering" refers to a process by which the eventual picture is drawn by the disclosed technique. In a representative embodiment, rendering is implemented by ray tracing, although this is not a limitation. The term "dynamic" refers to changes to the output rendering resolution at each frame, or as needed. The term "real-time" generally refers to a frame per second update rate greater than a predetermined value, such as 24.

The term "continuous" refers to the number of pixels that are added to or subtracted from a final picture every frame to ensure that the picture only changes a small amount, to ensure smoothness. The "continuous real-time dynamic rendering resolution" function changes a number of pixels horizontally and vertically by a small amount with respect to a picture that is drawn at a frame update rate (preferably >24 frames per second) to provide high resolution rendering. This feature is beneficial as it allows higher rendering quality than is possible for fixed resolution, which cannot guarantee real-time frame rates especially with respect to any position in space.

Figure 5:
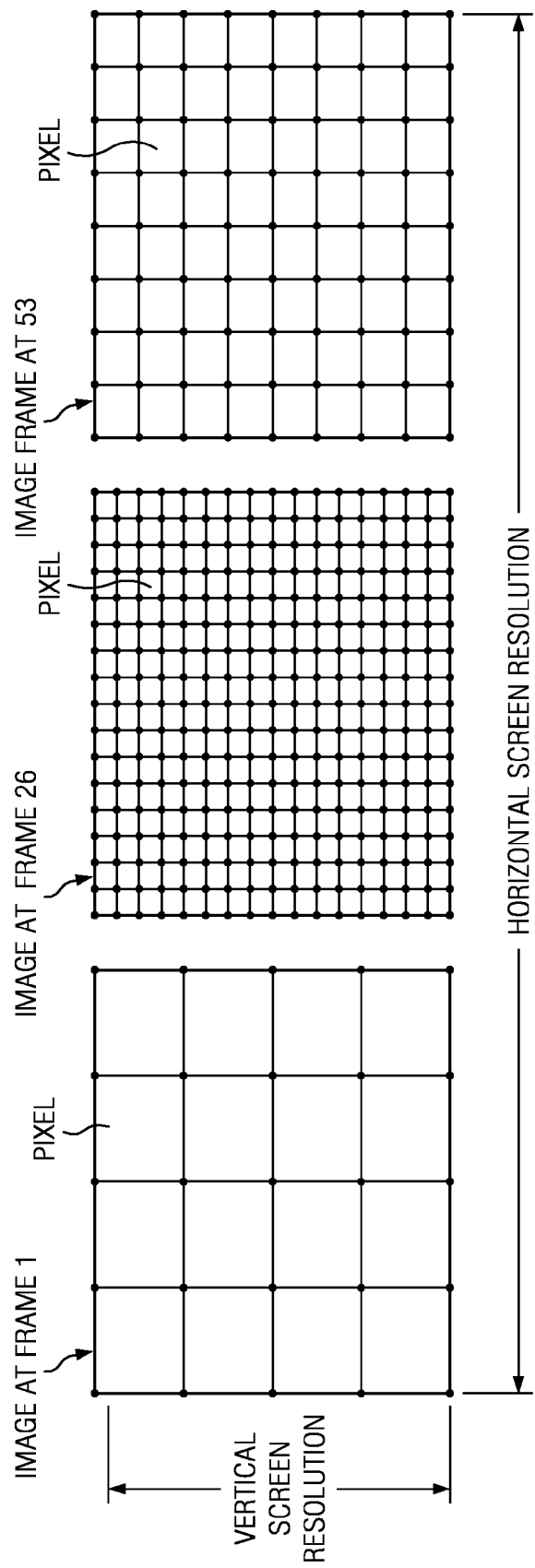
FIG. 5 illustrates a dynamic rendering resolution technique of this disclosure.

The dynamic rendering resolution is illustrated in FIG. 5. This figure shows three (3) representative (random) frames of a set of display frames of the displayed image. Each frame represents a single final image, and the set of final images (from the set of frames) represent the displayed image as rendered on the display at a given point in time. As illustrated, each pixel in each frame is uniform, although according to the "dynamic rendering resolution" function of this disclosure, the resolution can vary across particular frames. Thus, in this example, frame 1 as 16 pixels, frame 26 has 256 pixels, and frame 53 has 64 pixels. Generalizing, when an image of the volume dataset is rendered at a given number of frames per second, at least first and second frames of the image have varying resolution.

This dynamic rendering resolution function preferably is achieved as follows. Inside a main display processing loop, and at a minimum of "desired" frames per second, the routine calculates a difference between a current frame rate and a desired frame rate. When the difference is positive (i.e., when the desired frame rate is greater than current frame rate), the display routine use one less pixel column or pixel row alternately (or one less of each) in the final image to render a next frame. This operation "speeds up" the rendering application and helps achieve the desired frame rate. If, on the other hand, the difference in frame rate is negative (i.e., the desired frame rate is less than the current frame rate), the display routine uses one more pixel column or pixel row alternately (or one more of each) in the final image to render the next frame. This increases the rendering resolution and, thus, the quality of the rendered image. At the end of each frame, the routine rescales the image back to screen resolution with or without interpolation to account for the change in the number of pixels. This process speeds up the rendering because ray tracing is inherently very dependent on the total number of cast rays in the final image. If that number is reduced, the application speeds up.

Figure 6:
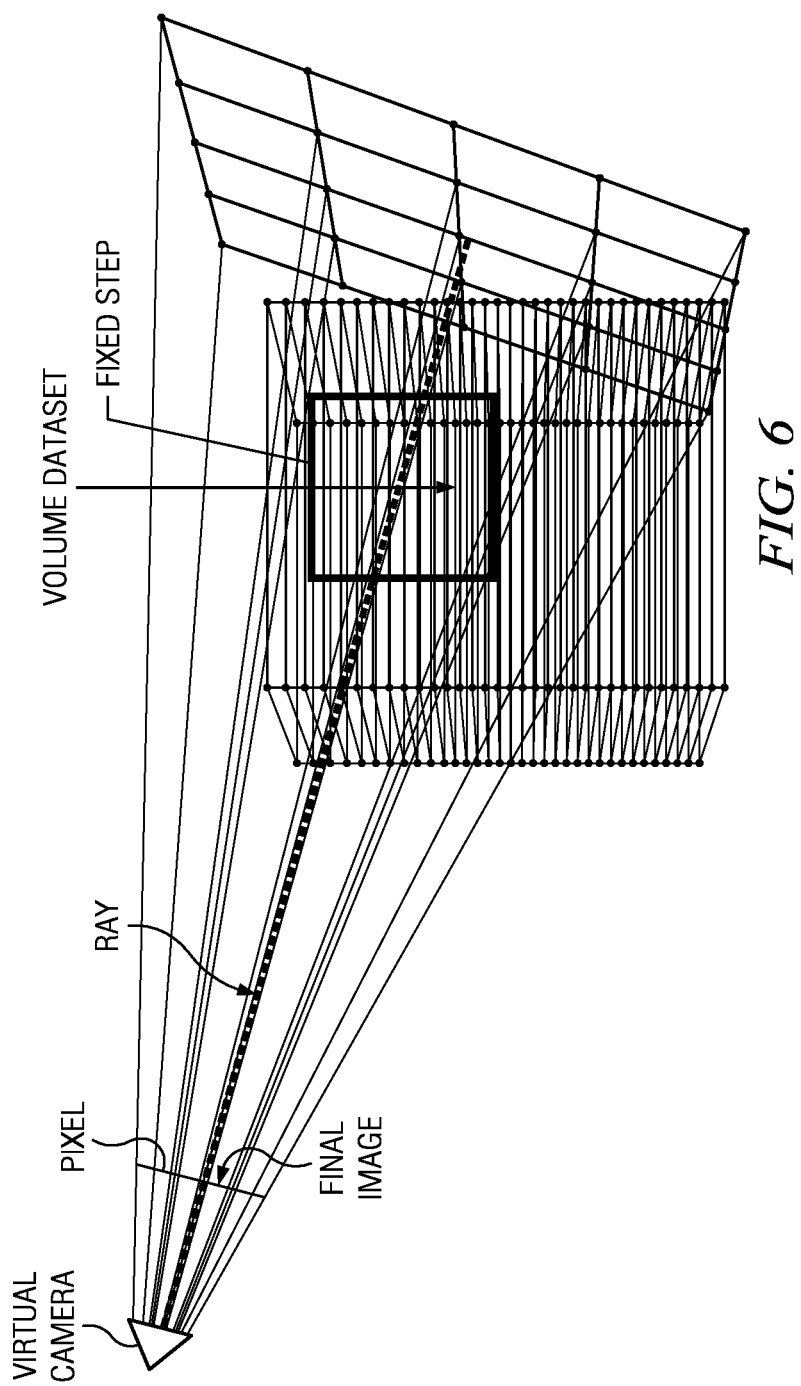
FIG. 6 illustrates a fixed step ray tracing technique.
Figure 7:
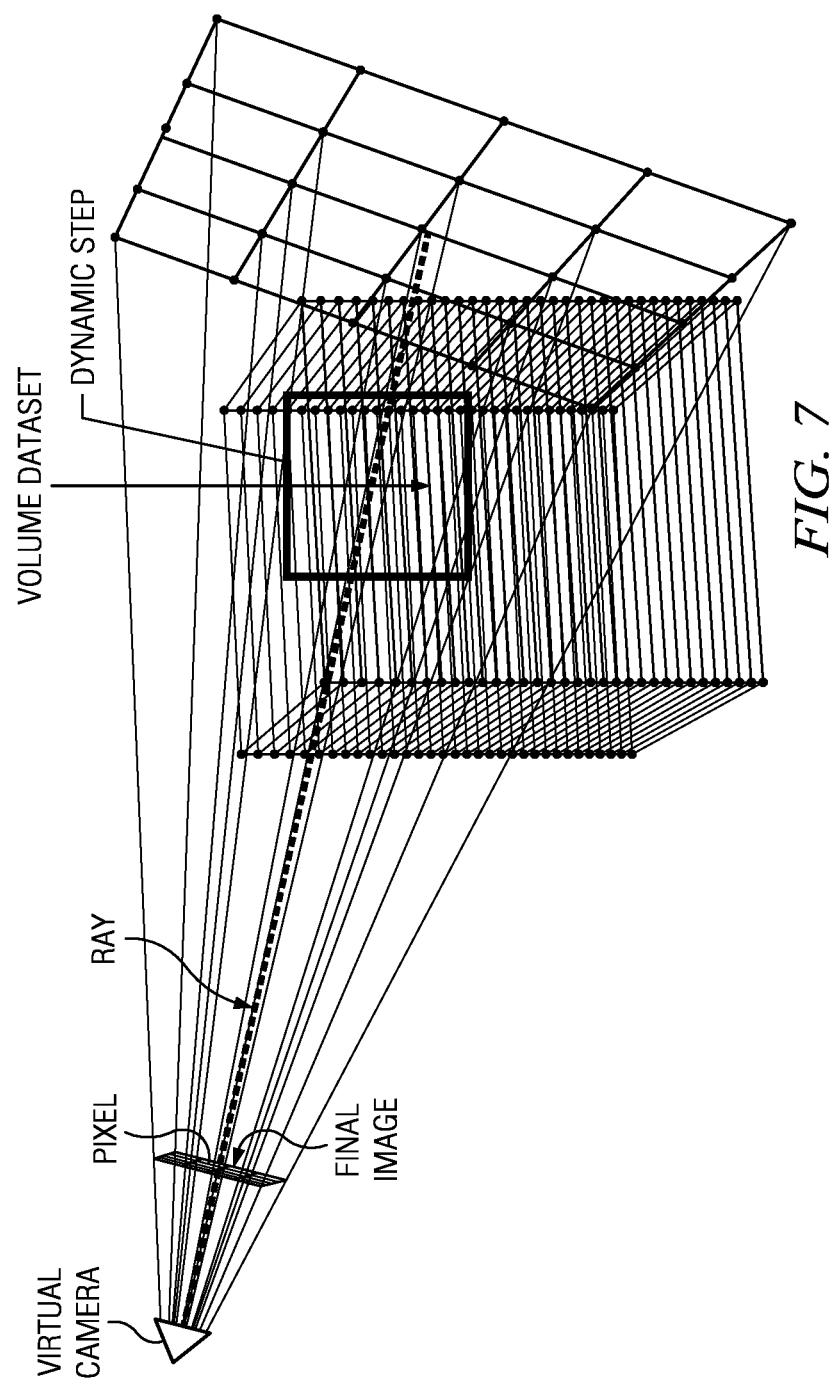
FIG. 7 illustrates a dynamic step ray tracing technique of this disclosure.

In addition to dynamic rendering resolution, the display method of this disclosure implements an approach referred to as "continuous per pixel dynamic sampling distance for ray tracing," as is now described. By way of background, FIG. 6 illustrates a "fixed step" approach wherein the distance from each previous sampling location (represented by a dot) along the length of the ray is the same. This fixed step pattern does not take into consideration the characteristics of the volume dataset itself (e.g., the density at the particular intersection point in the CT scan, or the value of electron spin at the particular point in the MRI scan), but simply generates the sample at a particular uniform location along the ray. This fixed step approach does not produce satisfactory results. According to this disclosure, the sampling distance along the length of a ray is permitted to vary dynamically within each pixel. Preferably, the step changes after a sampling of the dataset (and, in particular, after each sampling) and in relation to a value contained in the dataset. Further, preferably a distance added to or subtracted from a current step along the ray preferably is small to ensure smoothness as the ray traverses through the dataset. In a preferred embodiment, each ray (each corresponding to a pixel) adjusts its own unique step dynamically as it traverses through and samples the dataset. In effect, the ray speeds up or slows down as needed. For every pixel in the output image on a per sample basis, the display routine adjusts the unique sampling distance along the length of the ray cast forward in space, which represents a single pixel in the rendered image, in relation to the values sampled from the dataset. Generalizing, at least first and second pixels within a particular frame have a varying number of ray tracing steps relative to one another. This approach facilitates high-resolution rendering at real-time frame rates while avoiding any restrictions on the virtual camera in terms of its position and orientation in space.

Figure 8:
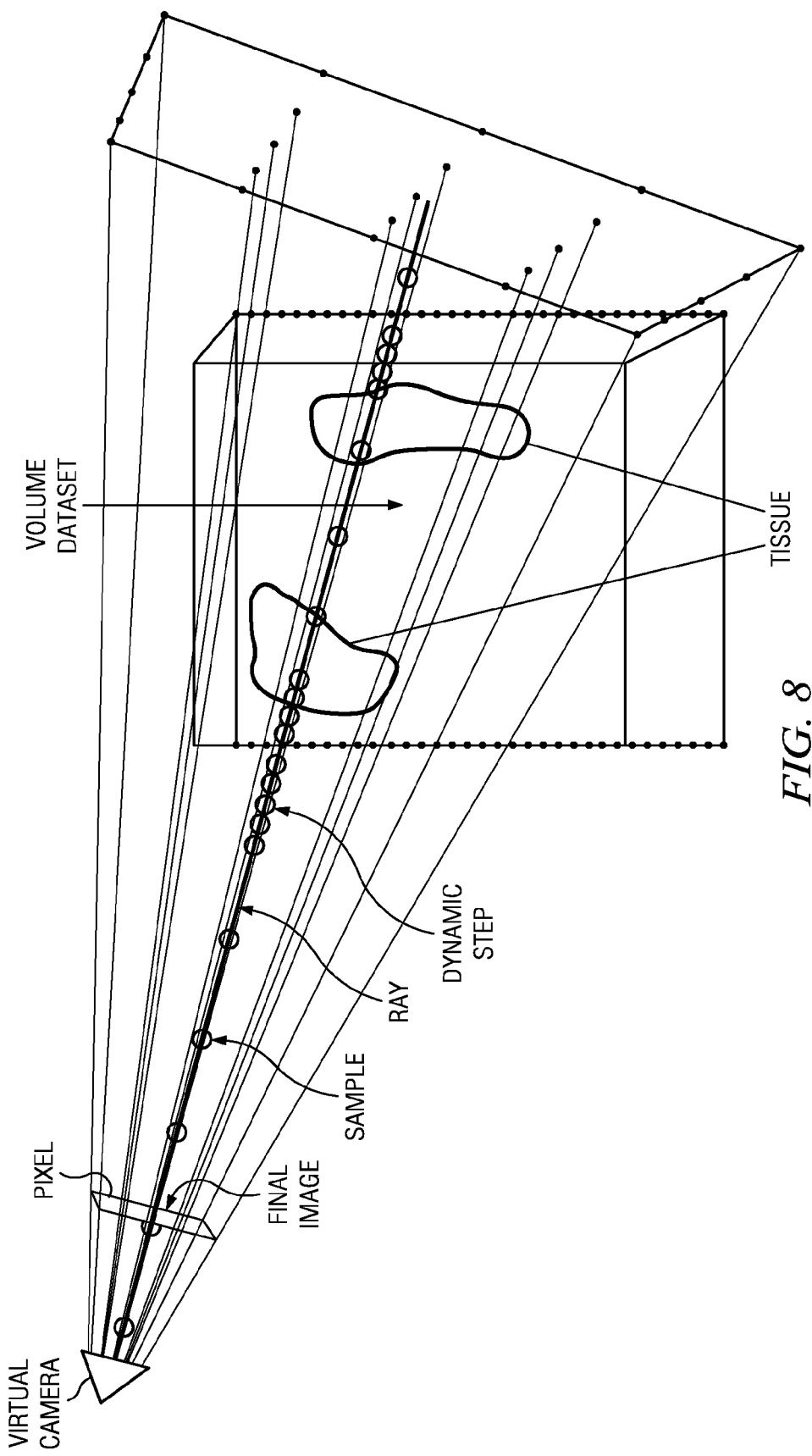
FIG. 8 illustrates the dynamic stepping approach showing how the number of steps varies along the ray in areas where tissues are located.
Figure 9:
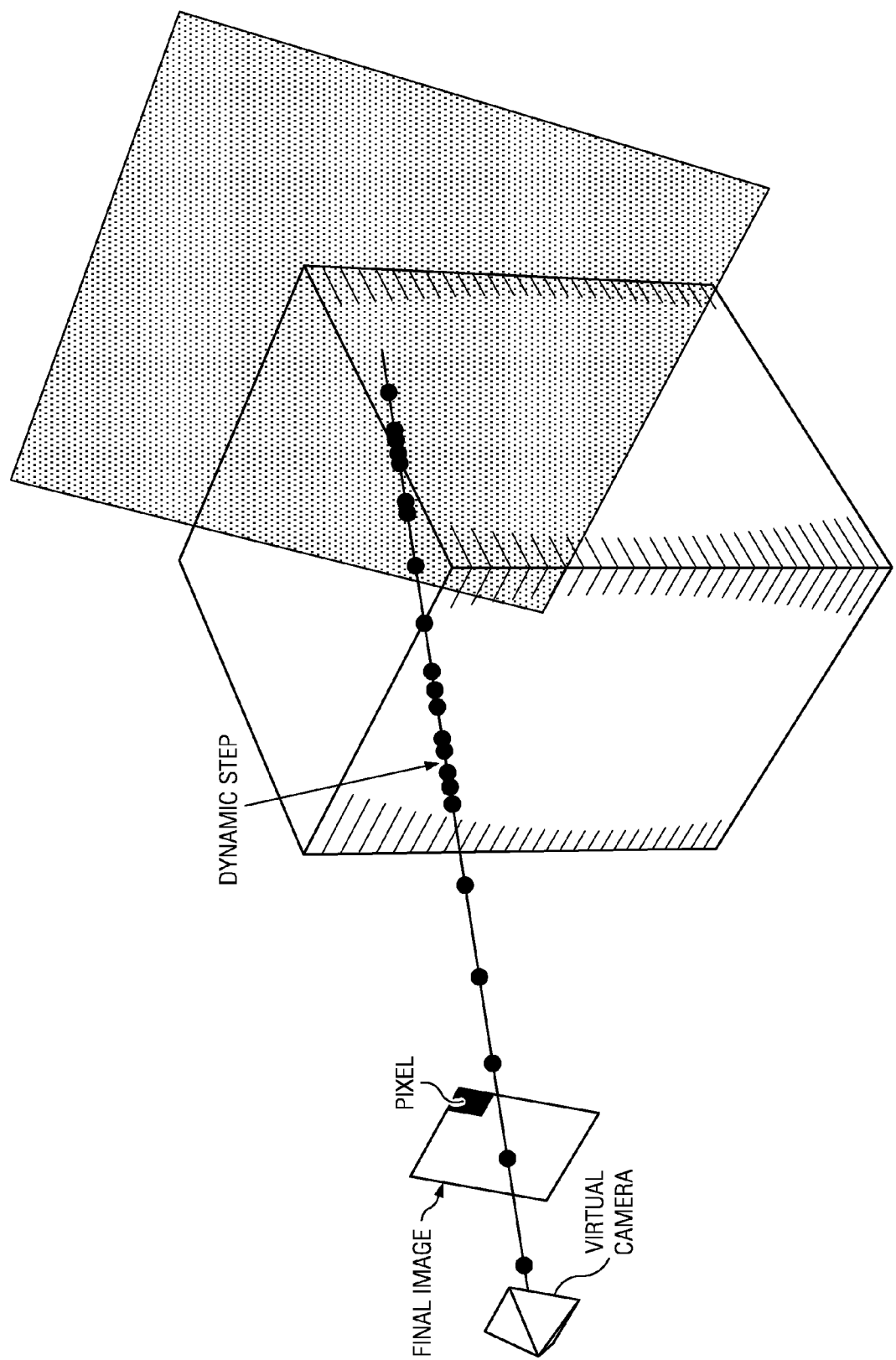
FIG. 9 is another view showing the dynamic stepping approach of FIG. 8.

A preferred approach to implementing the per-pixel dynamic sampling distance for ray tracing is now described. For every frame at real time rates, and for every pixel in the final image, the routine "starts" the ray at the camera position. Then, the routine sets the ray's direction to be the camera direction plus the pixel position in the image transformed into world space. This operation amounts to an aperture or lens for the 3D camera; as a result, the ray has both a position and a direction. The program then steps down the ray, stopping at locations in order to sample the volume dataset. The distance that is stepped each frame is dependent on the value at the current sample point of the volume data and a value (e.g., CT density, MRI electron spin, or equivalent) of the desired tissue in current focus. In general, if the absolute value of the difference in desired tissue value and current sampled volume data is high, then a larger step is taken. If, however, the value of the difference in desired tissue value and current sampled volume data is small, then a smaller step is taken. Preferably, and as illustrated in FIGS. 8-9, the process concentrates the steps and samples in areas where the desired tissue values exist, while areas that are not in focus are spared (i.e., need not be subjected to dynamic stepping). At each step, preferably the routine takes the scalar sampled volume data value and scales it (e.g., to the range of −1000 to 1000 standard Hounsfield units, which are standard units for describing radio-density), and then the routine uses this value to look-up a color that corresponds to a certain type of material based on the Hounsfield number. (In the alternative, the value can be used directly for grey-scale images.) The routine then uses an accumulation method (e.g., pixel color equals tissue difference multiplied by the step color) to accumulate the color for this step onto the pixel itself. Preferably, at each step, a small value is added to the accumulated density. This process is repeated either until density is greater than a desired value or until the step distance itself is very small (e.g., a desired small value beyond which the eye can see), or until the maximum known depth is reached. When finished, the routine has the final color for this pixel. This approach is then repeated for every pixel in the final image.

When it is time for the next frame to be rendered, the camera is moved to its new position and orientation, and then whole process is repeated again.

For computational efficiency, the above-described approach may be implemented using a GPU so that many pixels can be processed in parallel. In the alternative, a multi-core CPU can be used to facilitate the parallel processing.

Figure 10:
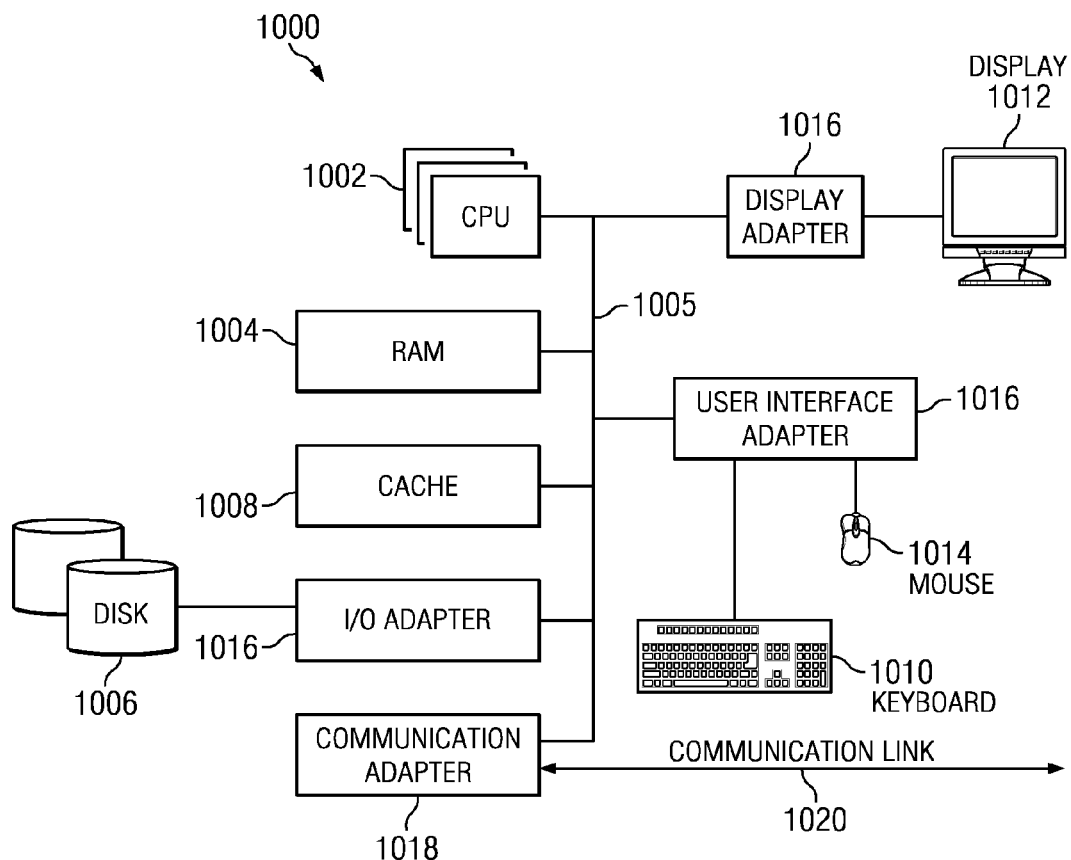
FIG. 10 is a machine in which the disclosed visualization methods may be implemented.

FIG. 10 illustrates a representative data processing system 1000 for use in processing the digital data in the above-described manner. A data processing system 1000 suitable for storing and/or executing program code will include at least one processor 1002 coupled directly or indirectly to memory elements through a system bus 1005. The memory elements can include local memory 1004 employed during actual execution of the program code, bulk storage 1006, and cache memories 1008 that provide temporary storage of at least some program code to reduce the number of times code must be retrieved from bulk storage during execution. Input/output or I/O devices (including but not limited to keyboard 1010, display 1012, pointing device 1014, etc.) can be coupled to the system either directly or through intervening I/O controllers 1016. Network adapters 1018 may also be coupled to the system to enable the data processing system to become coupled to other data processing systems or devices through networks 1020. The rendering program that implements dynamic rendering resolution and dynamic per-pixel ray tracing is stored in local memory 1004, as are the data structures and associated data generated during the rendering process. As noted above, in an alternative embodiment, the data processing system includes a GPU and associated graphics card components.

While certain aspects or features have been described in the context of a computer-based method or process, this is not a limitation of the invention. Moreover, such computer-based methods may be implemented in an apparatus or system for performing the described operations, or as an adjunct to other dental restoration equipment, devices or systems. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including optical disks, CD-ROMs, and magnetic-optical disks, read-only memories (ROMs), random access memories (RAMs), magnetic or optical cards, or any type of media suitable for storing electronic instructions, and each coupled to a computer system bus. The described functionality may also be implemented in firmware, in an ASIC, or in any other known or developed processor-controlled device.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic. Further, while given components of the system have been described separately, one of ordinary skill will appreciate that some of the functions may be combined or shared in given systems, machines, devices, processes, instructions, program sequences, code portions, and the like.

While given components of the system have been described separately, one of ordinary skill will appreciate that some of the functions may be combined or shared in given instructions, program sequences, code portions, and the like.

The volume dataset may be generated from any data source. It is not required that the volume dataset be CT or MRI data, or that the data itself be medical imaging data. The techniques herein may be used within any volume dataset irrespective of content.

In one embodiment, a tangible (non-transitory) machine-readable medium stores the computer program that performs the dynamic rendering resolution and dynamic per-pixel ray tracing during the process of rendering the volume dataset on the display. The program receives the volume dataset and renders the virtual camera construct (which lives inside the machine). The program moves and re-orients the camera under the user's control, altering the view as desired. As described, the dynamic rendering resolution process increases or decreases the number of pixels in each frame of a set of frames, while the per-pixel dynamic stepping increases or reduces the number of ray tracing steps per pixel. By continuously reducing the resolution across frames and reducing the number of steps per pixel within a frame, the program can speed up its overall rendering of the image at the desired frame rate, and in this manner the virtual camera construct can be positioned and oriented anywhere, including within the volume dataset itself. The virtual camera has complete freedom-of-motion within and about the volume dataset; thus, the viewer has the ability to move to any position in 3D space and look in any direction in real-time. The described approach enables real-time tissue selection and segmentation in 3D so that various tissues (including bone) are visualized without requiring the program to continually re-build a 3D mesh or to use preset tissue palettes.

Volume Rendering Using Scalable GPU-Based Cloud Computing

The above-described volume rendering techniques are computational-intensive and involve large amounts of data.

In an alternative embodiment, which is now described, a GPU-based cloud computing platform is used to facilitate data computations on behalf of requesting users. In this embodiment, a user of a thin client has an associated dataset that requires computation. That dataset is adapted to be delivered to a computing platform, such as the GPU-based cloud, for computation, such as to facilitate a 3D volume rendering. The result of the computation must be returned to the user. Multiple such users may be operating clients and requesting computations from the cloud in a similar manner, concurrently.

A requesting user may be a computing entity such as described above in FIG. 1 and the dataset may be information derived from a virtual camera. The one or more algorithms described above (e.g., the continuous per pixel dynamic sampling distance for ray tracing) may be computed in the cloud. The dataset may be a particular set of one or more frames from the virtual camera. Each dataset may be a set of one or more frames from one or more distinct virtual cameras, or a virtual camera in multiple positions.

According to this disclosure, there are several "shared" use cases: (1) "sharing" involves multiple users sharing one or more GPUs; and (2) "distribution" involves one user using multiple GPUs. Each use case is now described.

Sharing:

In order for more than one user to share a single GPU, all the users' datasets must be able to fit in the onboard memory of the GPU simultaneously. Once all the users' datasets are loaded into the GPU memory, a pixel shader with a dedicated number of pixels is assigned to each user. Preferably, other users are able to join and share resources even after another user has begun a session. Typically, the assigned number of pixels for each user dynamically changes in relation to the number of users sharing that particular GPU. As described herein, a pixel represents a work unit, and the more pixels that are assigned to a particular user, the more computational resources they are sharing. By dynamically changing the number of pixels any particular user is sharing, the system is able to support a dynamic number of users. This is in contrast to general GPU cloud computing where users cannot simultaneously share a single GPU, but rather the cloud contains many GPUs and they are handed out on a one to one basis.

Distribution:

It is possible that under light load conditions on a GPU cloud consisting of many GPUs, a single user may be allowed to utilize resources from more than one GPU simultaneously.

If the user has requested and is authorized to do so, additional pixels, or work units, may be assigned to a particular user from more than one GPU. While normal GPU cloud computing does not allow for utilization of more than one GPU by a single user, the method described here does. In fact, the only requirement of this method is that the user's dataset must be able to fit on however many GPUs they are utilizing. In other words, the entire user dataset must be duplicated across all shared GPUs. Using this method, a single user would be able to harness the vast resources of an entire GPU cloud under light load conditions.

In either use case scenario, the results of this GPU-based computation must be transferred back to the user who is in control of them. This can be achieved using normal binary file transfer over fast networks, or optionally, the resultant data (which may be a video stream or some other type of data) may be encoded or compressed (prior to streaming) to achieve faster network transfer. The resultant data could be transferred in either a real-time manner or on an as needed basis. In other words, this method could be used either for long term and time consuming calculations or very short term (real-time) calculations, and thus could be used for real-time applications such as 3D volume rendering.

The thin client device the user is operating must be able to both send datasets to the GPU cloud for calculation and then be able to both receive the possibly compressed or encrypted data and display it. The thin client device is also able to send user input, in particular, mouse locations or clicks, keyboard key presses, and other human interface devices like joysticks. In the method described above, a remote user on a thin client, low power device, is able to share vast GPU resources over a fast network and remotely send control commands in real time to the cloud for immediate calculation and feedback.

The techniques concerning scalable GPU-based cloud computing are described herein with reference to volume rendering for exemplary purposes only. The more generalized techniques may be used for processing any type of data.

The cloud platform may comprise co-located hardware and software resources, or resources that are physically, logically, virtually and/or geographically distinct. Communication networks used to communicate to and from the platform services may be packet-based, non-packet based, and secure or non-secure, or some combination thereof.

The technique described above allows scalable cloud computing both in terms of the number of simultaneous users and in terms of providing vast computational resources to a single user when the cloud is not under heavy load. The technique allows both the sharing and utilization of vast computational resources to users on fast networks using thin client devices.

Having described our invention, what we now claim is as follows.

The invention claimed is:

1. A method of computing 3D volume rendering data in a cloud compute environment having a set of cloud hosts, comprising:
   receiving, from one or more requesting users, a dataset associated with a 3D volume rendering operation at a client, the dataset representing an image at a given number of frames per second, each frame of the image having a uniform distribution of pixels, at least two frames of an image sequence having varying resolution with respect to one another, and at least two pixels within a particular frame each being associated with a ray having a varying number of ray tracing steps with respect to one another, the ray sampling the dataset along a set of sampling points whose locations along the ray are determined as the ray is cast;
   performing a volume rendering computation on the dataset in the cloud compute environment using at least one cloud host having a graphics processing unit (GPU), the volume rendering computation calculating a continuous per-pixel dynamic sampling distance for ray tracing initiated from a virtual camera associated with the client, the continuous per-pixel dynamic sampling distance being a distance between two sample locations that varies dynamically and in a non-uniform manner as a function of how values of voxels are changing within the 3D volume; and
   returning a result of the volume rendering computation to the requesting user, the result adapted to facilitate a 3D volume rendering of an image from the virtual camera based on the dataset.

2. The method as described in claim 1 further including assigning datasets from two or more users to a single graphics processing unit (GPU) in a cloud host and performing a volume rendering computation on each dataset concurrently.

3. The method as described in claim 1 further including distributing a dataset of a particular requesting user across two or more graphic processing units (GPUs) in respective cloud hosts and performing a volume rendering computation on each dataset concurrently.

4. The method as described in claim 1 wherein the result is returned to the requesting client as an encoded or compressed stream.

5. A method of computing 3D volume rendering data in a cloud compute environment having a set of cloud hosts, comprising:
   receiving, from each of multiple requesting users, a dataset associated with a 3D volume rendering operation at a client associated with a particular requesting user, the dataset representing an image at a given number of frames per second, each frame of the image having a uniform distribution of pixels, at least two frames of an image sequence having varying resolution with respect to one another, and at least two pixels within a particular frame each being associated with a ray having a varying number of ray tracing steps with respect to one another, the ray sampling the dataset along a set of sampling points whose locations along the ray are determined as the ray is cast;
   performing a volume rendering computation on each dataset in the cloud compute environment using a cloud host having a shared graphics processing unit (GPU), wherein the shared GPU assigns a given volume rendering computing work unit per requesting user as a function of a number of requesting users sharing the GPU; and
   returning a result of the volume rendering computation to each requesting user, the result adapted to facilitate a 3D volume rendering of an image based on the dataset;
   wherein the volume rendering computation calculates a per-pixel dynamic sampling distance for ray tracing initiated from a virtual camera associated with the client, the continuous per-pixel dynamic sampling distance being a distance between two sample locations that varies dynamically and in a non-uniform manner as a function of how values of voxels are changing within the 3D volume.

6. The method as described in claim 5 wherein the given volume rendering computing work unit is a pixel.

7. The method as described in claim 6 wherein the volume rendering computation is performed by a pixel shader.

* * * * *